No. 628,324. Patented July 4, 1899.
H. C. HOLCOMBE & J. W. & F. M. MADDOX.
METAL FASTENER FOR ENVELOPS, &c.
(Application filed Aug. 13, 1898.)
(No Model.)
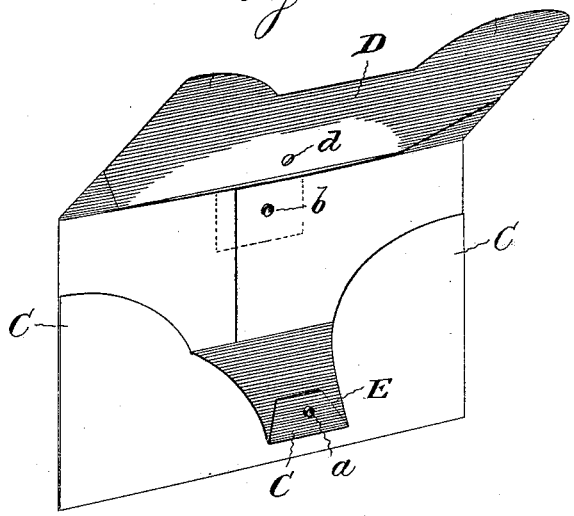
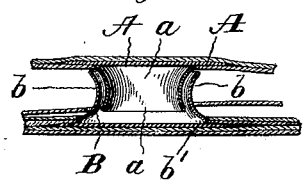 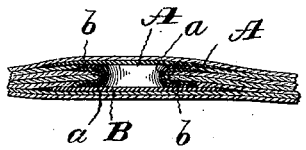
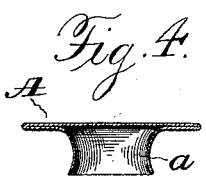
Witnesses:
Jas. E. Hutchinson.
C. J. Williamson.
Inventors.
Henry C. Holcombe, John W. Maddox and
Francis M. Maddox, by
Grindle and Russell, their Attys.

UNITED STATES PATENT OFFICE.

HENRY CANNON HOLCOMBE, JOHN WILSON MADDOX, AND FRANCIS MARION MADDOX, OF AUSTIN, TEXAS.

METAL FASTENER FOR ENVELOPS, &c.

SPECIFICATION forming part of Letters Patent No. 628,324, dated July 4, 1899.

Application filed August 13, 1898. Serial No. 688,503. (No model.)

*To all whom it may concern:*

Be it known that we, HENRY CANNON HOLCOMBE, JOHN WILSON MADDOX, and FRANCIS MARION MADDOX, of Austin, in the county of Travis, and in the State of Texas, have invented certain new and useful Improvements in Metal Fasteners for Envelops, &c.; and we do hereby declare that the following is a full, clear, and exact description thereof, reference being had to the accompanying drawings, in which—

Figure 1 is a perspective view of an envelop provided with our metal fastener; Fig. 2, a detail view in section, on an enlarged scale, through the metal fastener before the parts thereof have been united; Fig. 3, a like view thereof after they have been united; and Fig. 4, a detail view in section of one of the fastener parts constructed differently from those in Figs. 2 and 3.

Letters of like name and kind refer to like parts in each of the figures.

The object of our invention is to provide a simple, efficient, and easily-used fastener adapted more especially for envelops, but capable of other uses; and to these ends said invention consists in the fastener constructed substantially as hereinafter specified.

Our fastener is composed of two parts or members that are substantially alike—a male member A and a female member B, each consisting of a flat disk-form base or head and a hollow projection or shank at the center of the base or head that at mid-length is contracted in diameter and flares or is expanded outward at each end. The internal diameter of the female-member projection $b$ at its most contracted point is such that the male-member projection $a$ can readily pass into the projection, and at the point where said projection $b$ joins the female-member base or head there is an internal narrow annular space or cavity $b'$, the use of which will presently appear. The internal diameter of the female projection $b$ at its most contracted point is not greater than the diameter of the outer or free end of the male projection, and hence when the two parts are thrust together, as shown in Fig. 2, the expanded free end of the male will by engaging the contracted part of the female prevent any separation of the two parts without the application of some force. The two parts are thus when combined, as shown in Fig. 2, temporarily fastened together, and an important advantage of this is that before the fastener is applied for use the two complementary parts thereof may be kept together in readiness for use. This feature is also useful, of course, when it is desired to temporarily close an envelop to which the fastener is applied.

It is to be observed that our fastener before the two parts thereof are secured together as a complete article of manufacture has the free outer end of each shank outwardly flared.

To clearly explain the manner of using our fastener, we illustrate it applied to an envelop C, the envelop selected for illustration being provided with a closing-flap D and a supplemental flap E, designed to overlap the other. The female member B is secured to the envelop close to the mouth thereof, its head or base being on the inside of the envelop and covered by a piece of paper and its projection $b$ protruding on the outside of the envelop. The male member A is attached to the flap E by having its base or head confined between overlapping portions thereof, with its projection $a$ protruding on what is the inner face of said flap. To close and secure the envelop, the flap D is folded over upon the back thereof, a hole $d$ in the flap passing over the female projection $b$. The flap E is then turned over on the flap D, the male projection $a$ being carried into the female projection $b$, and then by a blow or pressure the two parts are united, as shown in Fig. 3. Owing to the hollow and slightly-flaring form of the male projection when it is pressed against the flat bottom of the female base it spreads laterally, entering the annular space $b'$ at the base of the female, and thus the secure union of the two parts is effected. The projection $b$ of the female being pressed against the flare of the projection $a$ near the base of the male is spread out thereby over the surface of the envelop adjacent to the hole $d$ and itself constitutes a fastening or securing means for the flap or part through the hole of which it passes. The outward flare of the female projection is also important, because it conduces to the ready spreading and collapsing thereof, and hence it does not offer undue opposition to the like action of the male projection and enables the more complete flattening of the parts, so that the combined thickness thereof when united is not objectionably great. Unless complete collapsing and flattening were possible the envelop would have an objectionable bulge or projection. Owing to the manner in which the two parts of the fastener are attached to the envelop, they are completely concealed from view when the envelop is closed or sealed. The metal of which the fastener parts are formed is quite ductile, so that but little force is required to compress and unite them as described. As there are no ribs or other offsets on the shanks, there is no obstacle to the close and tight bringing together of portions of the envelop to be united, and hence the sealing is not only free from undue thickening or bulging, but it is close and secure.

The base or head and the shank of each fastener part or member may be made as shown in Figs. 2 and 3 or as shown in Fig. 4, or otherwise, as may be found most desirable or expedient.

The utility and value of our fastener as applied to envelops are apparent when it is considered that though it is possible to separate surfaces that are gummed together the metal fastener presents an insuperable obstacle to the opening of the envelop without injury thereto and the affording of readily-detected evidence that it has been opened.

Having thus described our invention, what we claim is—

1. A fastener composed wholly of two complementary parts, each of which before the two are combined to form a permanent connection consists of a flat, or substantially flat base, and a connected hollow shank that is free from projections intermediate its ends, the shank of one being male, and that of the other female, and the free end of each shank being outwardly flared, and the base having the male shank being extended laterally outside of the shank, and the base having the female being extended laterally inside of the shank, whereby each shank is spread outward by the base of the other when the two parts are forced together, substantially as and for the purpose described.

2. A fastener composed wholly of two complementary parts, each of which before the two are combined to form a permanent connection consists of a flat, or substantially flat base, and a connected hollow shank that is free from projections intermediate its ends, the shank of one part being male, and that of the other female, and the base of the female having an annular recess, and the free end of each shank being outwardly flared and engaging the base of the other, and being spread outward thereby when the two parts are forced together, substantially as and for the purpose described.

3. A fastener comprising two complementary parts, each of which consists of a base and a hollow shank, the shank of one being male and that of the other female, the female being enlarged in diameter at its ends, its outer end and the outer end of the male being flared, and the diameter of the outer end of the male not being less than the smallest diameter of the female, and the base having the male shank being extended laterally outside of the shank, and the base having the female shank being extended laterally inside of the shank, whereby each shank is spread outward by the base of the other, when the two parts are forced together, substantially as and for the purpose described.

In testimony that we claim the foregoing we have hereunto set our hands this 4th day of April, 1898.

HENRY CANNON HOLCOMBE.
JOHN WILSON MADDOX.
FRANCIS MARION MADDOX.

Witnesses:
 CHAS. M. ROBERTS,
 M. ROBERTS.